(12) United States Patent
Henneboehle et al.

(10) Patent No.: US 7,909,225 B2
(45) Date of Patent: Mar. 22, 2011

(54) FRICTION-STIR TOOL WITH FORM-ADAPTABLE SHOULDER

(75) Inventors: Ulrike Henneboehle, Stuttgart (DE); Jürgen Silvanus, Munich (DE)

(73) Assignee: Airbus, Blagnac (FR)

( * ) Notice: Subject to any disclaimer, the term of this patent is extended or adjusted under 35 U.S.C. 154(b) by 54 days.

(21) Appl. No.: 12/097,116

(22) PCT Filed: Dec. 12, 2006

(86) PCT No.: PCT/EP2006/011976
§ 371 (c)(1),
(2), (4) Date: Aug. 15, 2008

(87) PCT Pub. No.: WO2007/068456
PCT Pub. Date: Jun. 21, 2007

(65) Prior Publication Data
US 2008/0296350 A1 Dec. 4, 2008

(30) Foreign Application Priority Data
Dec. 14, 2005 (DE) .......................... 10 2005 060 178

(51) Int. Cl.
*B23K 20/12* (2006.01)
(52) U.S. Cl. ...................................................... 228/2.1
(58) Field of Classification Search ............... 228/112.1, 228/2.1
See application file for complete search history.

(56) References Cited

U.S. PATENT DOCUMENTS

| | | | |
|---|---|---|---|
| 4,606,535 A * | 8/1986 | Larson | 271/10.03 |
| 5,697,544 A | 12/1997 | Wykes | |
| 5,718,366 A * | 2/1998 | Colligan | 228/112.1 |
| 5,834,062 A * | 11/1998 | Johnson et al. | 427/58 |
| 5,909,839 A * | 6/1999 | Belke et al. | 228/248.1 |
| 7,404,512 B2 * | 7/2008 | Baumann et al. | 228/44.3 |
| 2005/0092817 A1 * | 5/2005 | Baumann et al. | 228/212 |
| 2006/0102699 A1 * | 5/2006 | Burton et al. | 228/112.1 |
| 2008/0048005 A1 * | 2/2008 | Forrest et al. | 228/101 |

FOREIGN PATENT DOCUMENTS

| | | |
|---|---|---|
| DE | 101 48 958 A1 | 6/2002 |
| JP | 11 197856 | 7/1999 |
| JP | 2002 192359 | 7/2002 |
| JP | 2003260572 A * | 9/2003 |
| JP | 2003334672 A * | 11/2003 |
| JP | 2005 205496 | 8/2005 |

* cited by examiner

*Primary Examiner* — Emily M Le
*Assistant Examiner* — Carlos Gamino
(74) *Attorney, Agent, or Firm* — Oblon, Spivak, McClelland, Maier & Neustadt, L.L.P.

(57) ABSTRACT

A friction-stir tool including a rotary-drivable tool body, at whose end facing away from the drive is provided a shoulder, from which extends in the direction of that end of the tool body that faces away from the drive, a rotatable rod-shaped projection that has a smaller diameter than the shoulder. The surface of the shoulder that points in the direction of the projection is form-adaptable.

22 Claims, 5 Drawing Sheets

FRICTION-STIR TOOL WITH FORM-ADAPTABLE SHOULDER

TECHNICAL FIELD

The present invention relates to a friction-stir tool used in friction-stir welding and in friction-stir processing.

BACKGROUND OF THE INVENTION

Friction Stir Welding (FSW) is known to be employed increasingly in aeronautics and space engineering, in railway technology and in automobile construction. This simple, clean and innovative assembly method is distinguished by its high potential for automation and by dispensing with the requirement for rivets, the production costs being lowered and the weight of structures produced being reduced.

In friction-stir welding, as described, for example, in WO 93/10935, it is known to bring into contact, and hold in this position, two workpieces which are to be welded to one another. A welding rod or a rod-shaped projection of a corresponding tool is introduced with a rotational movement into the connection region of the workpieces, until a shoulder arranged on the tool above the welding rod lies on the surface of the workpieces. In this case, due to the relative movement between the tool and workpieces, frictional heat is generated, so that adjacent material regions in the connection region assume a plasticized state. While the rotating welding rod is in contact with the connection region, the tool is moved forwards along the connecting line of the workpieces, so that the material located around the welding rod is plasticized and subsequently consolidated. Before the material hardens completely, the welding rod is removed from the connection region or the workpieces. Due to the shoulder, which is in contact with the workpiece surface during welding, additional frictional heat is generated, and an escape of plasticized material can be prevented.

Materials, such as, for example, metals, their alloys, metal composite materials (what are known as MCCs) or suitable plastics, can be welded in this way as a butt joint, overlap-joint or T-joint connection. Of course, spot connections can also be generated, a forward movement of the welding rod which is in contact rotationally with the connection region or a relative translational movement between the rotating welding rod and workpieces being dispensed with.

However, the friction-stir technique is also employed in the repair, machining and finishing of workpieces and is usually designated as friction-stir processing. In this case, as described above, a rod-shaped projection is introduced with a rotational movement into at least one workpiece (that is to say, welding in solid occurs), in order to modify the workpiece material at least in the contact region of the welding rod. For repair purposes, the rotating welding rod is introduced, for example, into a crack of a workpiece, to name only one example of use.

The disadvantage of both friction-stir welding and friction-stir processing, however, is that welding or machining of curved components, in particular spherical components, has not been possible hitherto beyond special radii, since the shoulder can no longer be supported or, in the case of a concave component surface, lies above the assembly point. The same applies to the production of orbital seams, such as generated, for example, in the connection of pipes, half-shells or hemispheres. It has likewise not been possible hitherto to weld or machine components having any other surface contour (for example, with angular clearances).

PRESENTATION OF THE INVENTION

The object of the invention, therefore, is to provide a friction-stir tool, by means of which even curved components or otherwise shaped components can be welded or machined with high quality, and orbital or circumferential seams can be produced reliably in a simple way.

The friction-stir tool according to the invention comprises a rotary-drivable tool body, at whose end facing away from the drive is provided a shoulder, from which extends, in the direction of that end of the tool body which faces away from the drive, a rotatable rod-shaped projection which has a smaller diameter than the shoulder, and is characterized in that the surface of the shoulder which points in the direction of the projection is of form-adaptable design. In this context, the term "in the direction of that end of the tool body which faces away from the drive" is to be understood as meaning that the rotatable rod-shaped projection extends from that side of the shoulder which lies opposite the tool body or points away from the tool body.

The central idea of the invention is to provide a friction-stir tool with a shoulder, of which the surface pointing in the direction of the projection (or in the direction of the workpiece/workpieces) can be adapted to the contour of the workpieces to be connected or to be machined, in such a way that the said shoulder fits snugly against the surface of the workpieces; that is to say, the form of the shoulder surface pointing in the direction of the projection can be contoured variably. This property will be expressed by the term "form-adaptable".

For this purpose, the shoulder surface pointing in the direction of the projection is designed flexibly in such a way that either it automatically, that is to say by itself, fits snugly with the workpiece form upon contact with the workpieces to be connected or to be machined or it can be deformed in a controlled way actively, that is to say by action from outside (for example, mechanically, hydraulically, electrically or pneumatically), so as to be adapted to a corresponding form of the workpieces, in particular a curved form.

The advantage of this is that, even in the connection or machining of one-dimensionally or two-dimensionally curved components, the shoulder surface lies on the workpiece surface in regions in front of, next to and behind the rotating rod-shaped projection, in order in each direction to lie on the workpiece surface axially with respect to the axis of rotation of the rotating rod-shaped projection, so as effectively to prevent an axial escape of plasticized material over the entire shoulder surface.

Preferably, the shoulder surface pointing in the direction of the projection is deformable reversibly; that is to say, the shoulder surface also returns again into its mostly non-loaded initial state, for example with a plane non-deformed surface. If, for example, the projection of a friction-stir tool according to the invention is inserted with a rotational movement and action of force into a workpiece or into a connection region of two workpieces lying against one another, the shoulder surface pointing in the direction of the projection will first have an initial form, but, as soon as the shoulder surface pointing in the direction of the projection comes into contact with the workpiece, will adapt to the form of the latter, so that the shoulder surface fits snugly with the form of the workpiece continuously, that is to say without slits, gaps or waves. When the tool or the projection is drawn out of the workpiece material again, the shoulder surface resumes its initial form.

As already mentioned above, it is also possible, of course, for the shoulder surface pointing in the direction of the projection to be deformed in a controlled way actively, that is to say by external control, before or while it is brought into contact with the workpiece surface.

According to a preferred embodiment, the shoulder comprises a carrier body which is at least partially open in the direction of the projection and in which is arranged at least one element which is axially displaceable and/or of whose side pointing at least in the direction of the projection is designed resiliently. The form-adaptability described in the introduction is thereby implemented, and the term "axial displacement" is to be understood as meaning a displacement in the longitudinal direction, that is to say along the axis of rotation of the friction-stir tool. This ensures that various regions of the shoulder surface, as required, can be deflected differently in a direction perpendicular with respect to the shoulder surface.

Typically, the elements in the carrier body are arranged so as to surround the rod-shaped projection concentrically. A rotationally symmetrical arrangement gives rise to reliable adaptability of the entire cross section of the shoulder surface.

According to a particularly preferred first embodiment, in the carrier body a plurality of axially displaceable elements are arranged, of which the sides pointing in the direction of the projection form the shoulder surface pointing in the direction of the projection. Thus, to change the contour of the shoulder surface, each individual element can be displaced axially, the elements consisting, for example, of metal, ceramic or composite material with fixed, that is to say non-resilient outer contours. It is, of course, not ruled out additionally to design flexibly those sides of the elements which point in the direction of the projection. This, however, entails additional outlay.

In the first embodiment of the invention, the elements are typically designed as rod-shaped segments, the longitudinal directions of which run essentially in the axial direction. The cross sections of the rod-shaped segments in this case preferably form circular rings concentrically surrounding the projection, a virtually continuous face being formed by those sides of the rod-shaped segments which point in the direction of the projection. This virtually continuous face in this case constitutes the shoulder surface, very good form-adaptability being ensured, since the shoulder surface can be deflected in the axial direction at any point on the shoulder surface.

For this purpose, it is advantageous that each element can be activated singly, that is to say individually, in order to bring about its axial displacement. This may take place mechanically, hydraulically, pneumatically, electrically or in any other suitable way. Preferably, each element is connected to the carrier body via a spring element resilient in the axial direction. Passive form-adaptability of the shoulder surface is thereby ensured in a simple way, since each individual element, when brought into contact with the workpiece surface, can yield in the axial direction, in order thus to adapt the shoulder surface, composed of those individual sides of the preferably rod-shaped elements which point in the direction of the projection, to the form of the workpiece surface.

According to an alternative second embodiment of the invention, at least one freely formable body is arranged in the carrier body. The freely formable body is, in particular, a fluid cushion, but may also be another balloon-shaped body or an elastic or resilient material, which nevertheless ensures that the shoulder exerts a sufficient pressure on the workpieces to be connected or to be machined, in order to prevent gap formation between the shoulder and workpiece surface during the FSW process, so that no plasticized material can escape (for example, in the radial direction). An arrangement is also possible, however, in which two freely formable bodies designed in the form of a ring with different radii are arranged concentrically around the projection. Many other possibilities may, of course, also be envisaged.

In the second embodiment, it is expedient, in particular, that that side of the at least one freely formable body which points in the direction of the projection forms the shoulder surface pointing in the direction of the projection. Owing to the resilience of the freely formable body, in particular of its side pointing in the direction of the projection, it is possible to vary the form or contour of the shoulder surface over the entire area of the latter.

Furthermore, the second embodiment may be modified in such a way that the carrier body has arranged in it, between the at least one freely formable body and the open end of the carrier body, in addition, loose filling bodies which are displaceable at least in the axial direction and by which the shoulder surface pointing in the direction of the projection is formed. The loose filling bodies are in this case arranged displaceably in the carrier body, so that, when they come into contact with a workpiece, they adapt to the latter so as to copy the contour of the workpiece surface. Loose filling bodies of this type are, in particular, spheres of hard metal, ceramic or plastic and typically have a diameter of 0.1 to 5 mm.

Furthermore, it is expedient, both in the first and in the second embodiment of the invention, to close off the at least partially open end of the carrier body by means of a flexible material, for example a flexible metal sheet. This flexible material may additionally be provided, at least on its side pointing in the direction of the projection, with a coating which reduces friction or increases wear resistance. Such a coating may, of course, also be applied directly to those sides of the particularly rod-shaped elements which point in the direction of the projection (see the first embodiment) and to that side of the freely formable body which points at least in the direction of the projection (see the second embodiment).

The friction-stir tool according to the invention is used particularly in friction-stir welding or in what is known as friction-stir processing (that is to say, for the repair, machining or finishing of workpieces).

BRIEF DESCRIPTION OF THE DRAWINGS

Further features and advantages of the invention may be gathered from the following exemplary description of various embodiments according to the invention, in conjunction with the accompanying drawings in which.

Like components are designated by identical reference numerals in the figures. Components corresponding to one another are designated by a reference numeral increased by a factor of 10.

DESCRIPTION OF EXEMPLARY EMBODIMENTS OF THE INVENTION

Figure 1:
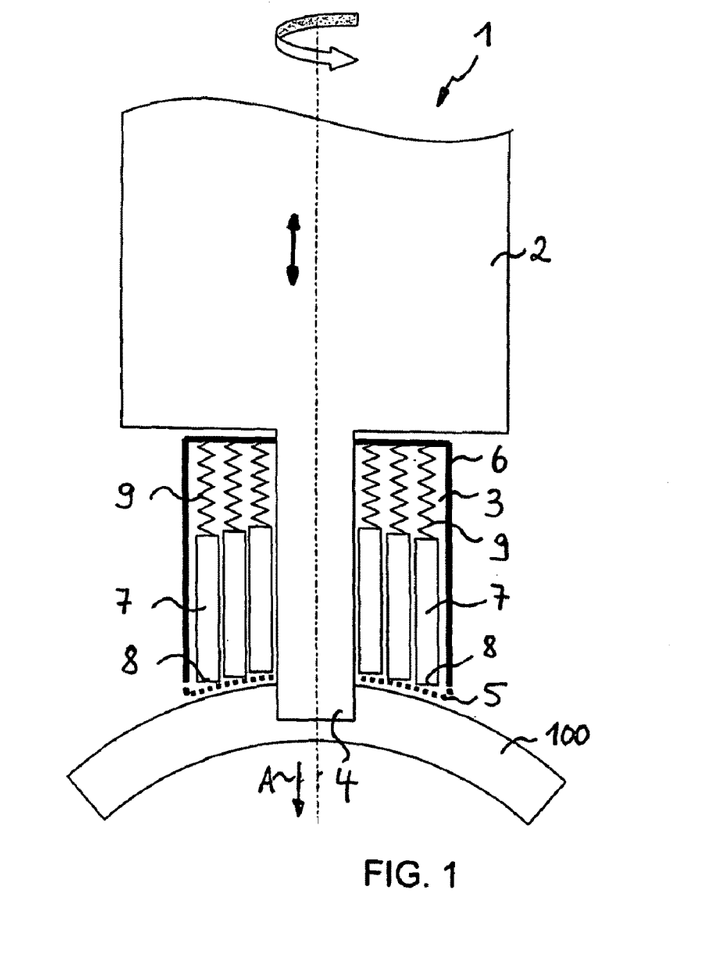
FIG. 1 shows a diagrammatic sectional view of a friction-stir tool according to a first embodiment of the invention.

FIG. 1 shows, in a diagrammatic illustration, a sectional view in the longitudinal direction of a rotationally symmetrical friction-stir tool 1 according to a first embodiment of the invention. As is known, the friction-stir tool 1 comprises a rotary-drivable tool body 2, at whose end facing away from the drive is provided a shoulder 3, from which extends, in the direction of that end of the tool body 2 which faces away from the drive, that is to say in the direction of the arrow identified by "A", a rotatable rod-shaped projection 4 which has a smaller diameter than the shoulder 3. In other words, the rod-shaped projection 4 extends from that side of the shoulder 3 which lies opposite the tool body 2 or points away from the latter.

Typically, the rod-shaped projection 4 is produced in one piece with the tool body 2, and, in the embodiment illustrated in FIG. 1, the shoulder 3, which is designed as a separate component, is arranged rotationally symmetrically around the rod-shaped projection 4. A simple assembly of the friction-stir tool 1 is thereby possible, for example by the shoulder 3 being pushed onto the rod-shaped projection 4 opposite to the direction designated by "A". This also ensures a simple exchange of the shoulder 3. Moreover, the shoulder 3 can be activated separately, that is to say independently of the rotation of the projection 4 or of the rotation of the tool body 2. The friction-stir tool according to the invention can in this case be operated with a stationary shoulder (that is to say, a rotational speed n=0) or at typical rotational speeds of between 5 and 5000 rpm.

The shoulder 3 illustrated in FIG. 1 is designed in such a way that the shoulder surface 5 which points in the direction of the projection 4, and which is illustrated diagrammatically in FIG. 1 by a dashed line, adapts to the form, in particular to the surface contour, of the workpiece 100, automatically, that is to say when the shoulder surface 5 and the workpiece surface are brought into contact. For this purpose, a plurality of elements 7 are arranged in a carrier body 6 which consists, for example, of metal, ceramic, composite material or the like, each individual element 7 being displaceable in the axial direction, which is identified in FIG. 1 by a double arrow. Those sides 8 of the individual elements 7 which point in the direction of the projection 4 form in this case the shoulder surface 5. The elements 7 should be arranged as closely next to one another as possible, so that virtually a continuous, that is to say unbroken, shoulder surface 5 is obtained. If gaps or slits which are too large are present between the individual element 7, plasticized material may possibly escape into these gaps and slits, this being a disadvantage.

Preferably, the individual elements 7 consist of firm, that is to say non-resilient or deformable, material (for example, metal, ceramic or composite material). The axial displaceability of the individual elements 7 is implemented in a particularly simple way in that each individual element 7 is arranged, via a spring element 9 resilient in the axial direction, on the upper side of the carrier body 6, that is to say on that side of the said carrier body which points in the direction of the tool body 2. When the friction-stir tool 1 is introduced with a rotating projection 4 into the workpiece 100 until the shoulder surface 5 and workpiece surface are in contact with one another, the shoulder surface 5 adapts to the form or to the contour of the workpiece surface, in that each individual element 7 is displaced in the axial direction in such a way that that side 8 of each individual element 7 which points in the direction of the projection 4 comes to bear against the surface of the workpiece 100, in order to form a continuous shoulder surface 5 fitting snugly against the workpiece surface 100. In this case, as a rule, the form of those sides 8 of the element 7 which point in the direction of the projection 4 does not vary, but this is not basically ruled out. In principle, a modification with resilient element sides 8, similarly to the second embodiment, is possible, but entails additional outlay.

The elements 7 are typically designed as rod-shaped segments, the longitudinal extents of which run essentially in the axial direction. As may be gathered from the depiction on the left of FIG. 7, which shows a cross-sectional view of the shoulder 3 illustrated in FIG. 1, the elements 7 are arranged concentrically around the projection 4 in such a way that the cross sections of the elements 7 form segments in the form of a circular ring (indicated by hatching in FIG. 7) which concentrically surround the projection 4.

In addition, the open end of the carrier body 6, the said open end pointing in the direction of the projection 4, may be closed off by means of a flexible material, for example an elastic bendable metal sheet. This is not illustrated in FIG. 1, but is explained in more detail below in connection with FIG. 5. The flexible material may additionally be provided, at least on its side pointing in the direction of the projection 4, with a coating which reduces friction or increases wear resistance.

The elements 7 explained in connection with FIG. 1 may, of course, also have another configuration or be displaced axially in another way, for example by the action of pressure. The action of pressure, indicated in FIG. 2 by the arrows designated by "P", may take place, for example, electrically, hydraulically, pneumatically or in another suitable way. Here, too, it is advantageous to actuate each individual element 7 separately from the other elements 7. Thus, the shoulder surface 5 can be set to a specific form or contour actively, that is to say by external control, before or during the FSW process. The type of operation and the functioning are otherwise as described in connection with FIG. 1.

Figure 2:
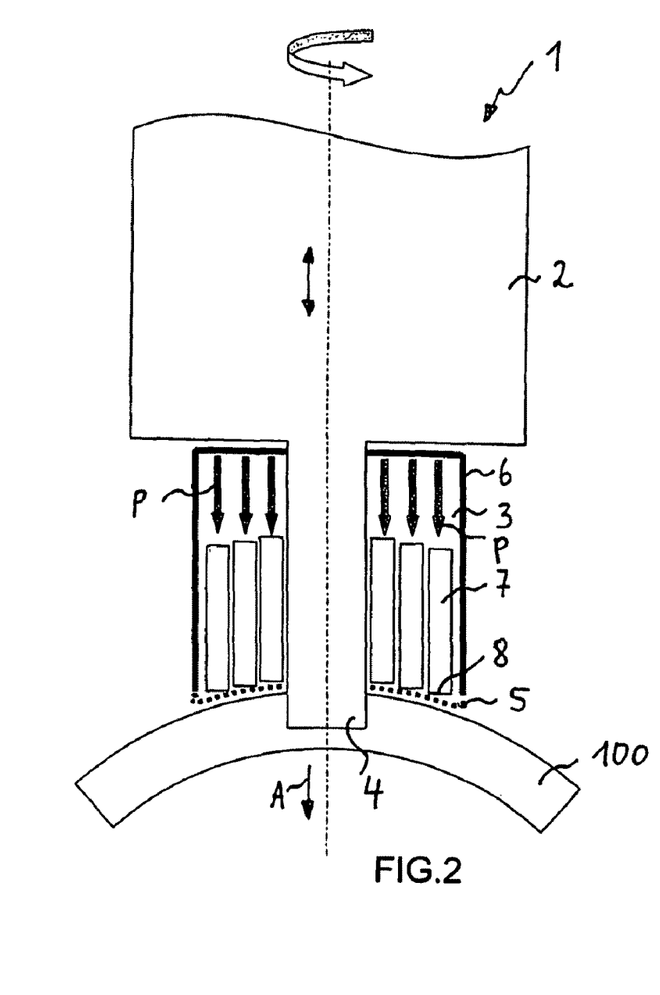
FIG. 2 shows a modification of the friction-stir tool illustrated in FIG. 1.
Figure 3:
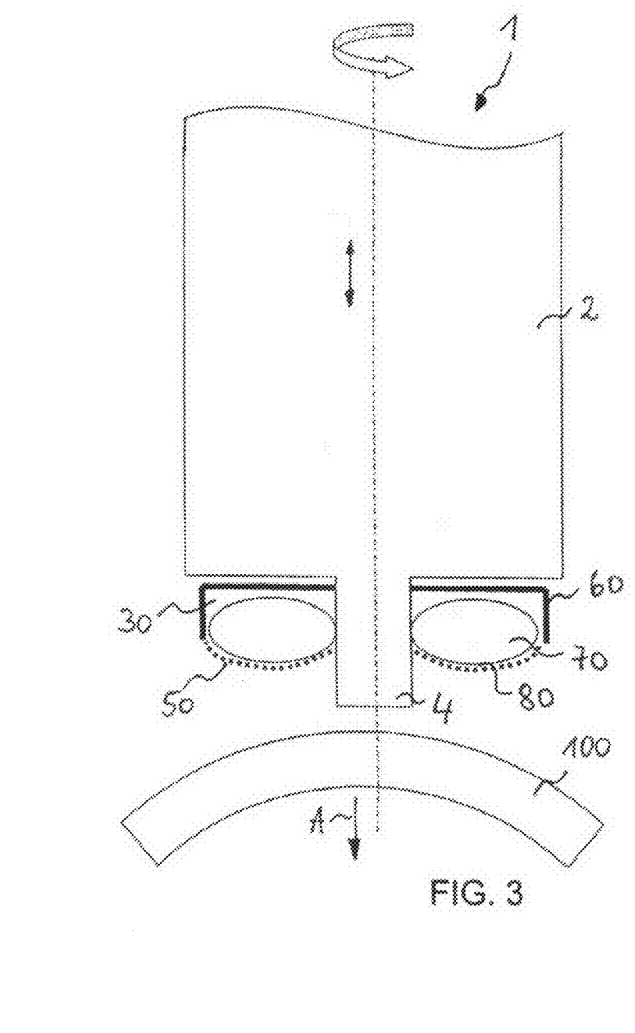
FIG. 3 shows a diagrammatic sectional view of a friction-stir tool according to a second embodiment of the invention in an initial state.

FIG. 3 shows a diagrammatic sectional view in the longitudinal direction of a friction-stir tool 1 according to a second embodiment of the invention. FIG. 3 illustrates an initial state in which the rod-shaped projection 4 is not yet in contact with the workpiece 100. The friction-stir tool 1 comprises a tool body 2, at whose end facing away from the drive is provided a shoulder which is designated by the reference numeral 30 to distinguish it from the embodiment according to FIG. 1. There extends from the shoulder 30, in the direction of that end of the tool body 2 which faces away from the drive, the rotatable rod-shaped projection 4 which has a smaller diameter than the shoulder 30, as already explained in connection with the first embodiment (FIGS. 1 and 2). The type of operation and the functioning of the shoulder 30 again correspond to those of the first exemplary embodiment.

As may be gathered from FIG. 3, the shoulder 30 has a carrier body 60 which is open at least partially in the direction of the projection 4 and in which at least one freely formable body 70, in particular a fluid cushion, is arranged. Instead of fluid cushions, other materials may also be used, which, on the one hand, are resilient or deformable, but, on the other hand, ensure that the shoulder 30 can exert a sufficient pressing force on the workpiece 100 in order to ensure that the shoulder 30 lies reliably on the workpiece surface. The fluid cushion 70 may be designed, for example, in the form of a ring and be arranged so as to surround the projection 4 concentrically. That side 80 of the freely formable body 70 which points in the direction of the projection 4 forms in this case the shoulder surface 50 which is again illustrated by dashes in FIG. 3. Of course, even a plurality of freely formable bodies may be arranged in the carrier body 60 in various ways.

Figure 4:
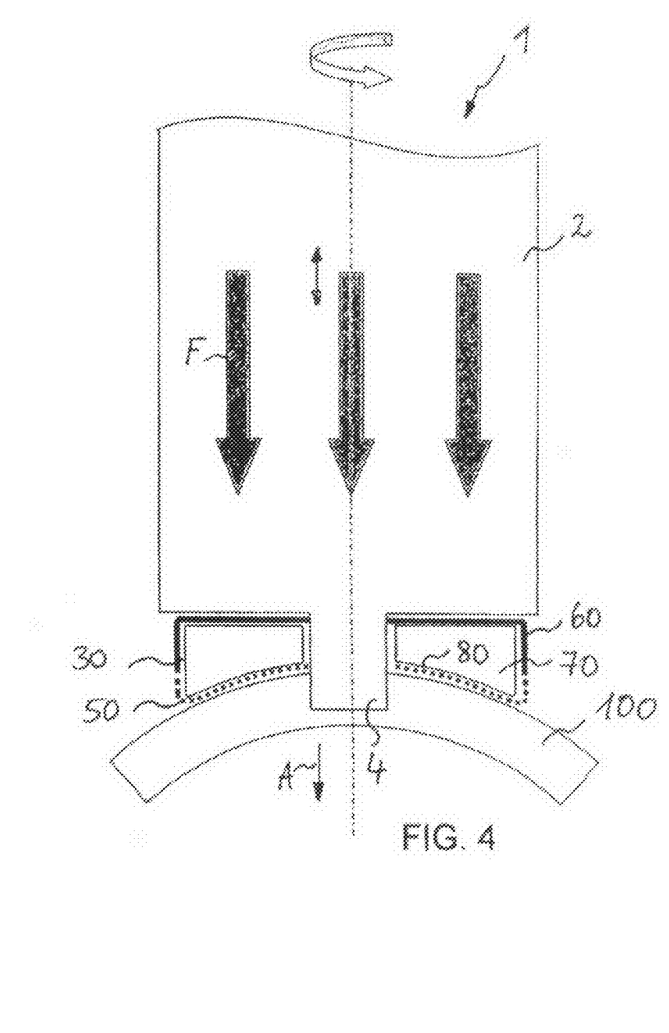
FIG. 4 shows the friction-stir tool illustrated in FIG. 3 in a welding or machining state.

When the friction-stir tool 1 is introduced with a rotating projection 4 into the workpiece 100, as illustrated in FIG. 4, the shoulder surface 50 is deformed when it is brought into contact with the workpiece surface. On account of the resilience of the fluid cushion 70, the latter is deformed, in particular its side 80 pointing in the direction of the projection, and comes continuously into a snug fit against the surface of the workpiece 100.

Figure 5:
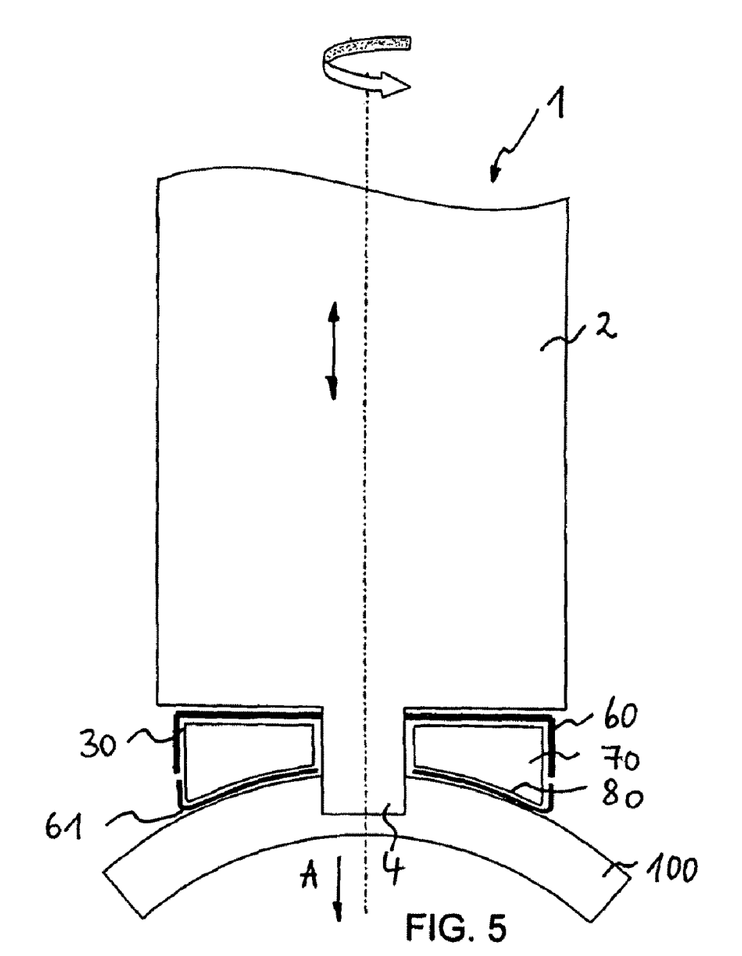
FIG. 5 shows a modification of the friction-stir tool illustrated in FIG. 4.

In so far as no separate mounting or fastening for the fluid cushion 70 is provided in the carrier body 60, that end of the carrier body 60 which points downwards, that is to say in the direction of the workpiece 100, may also be closed off by means of a flexible material 61, in particular a deformable metal sheet (see FIG. 5).

Figure 6:
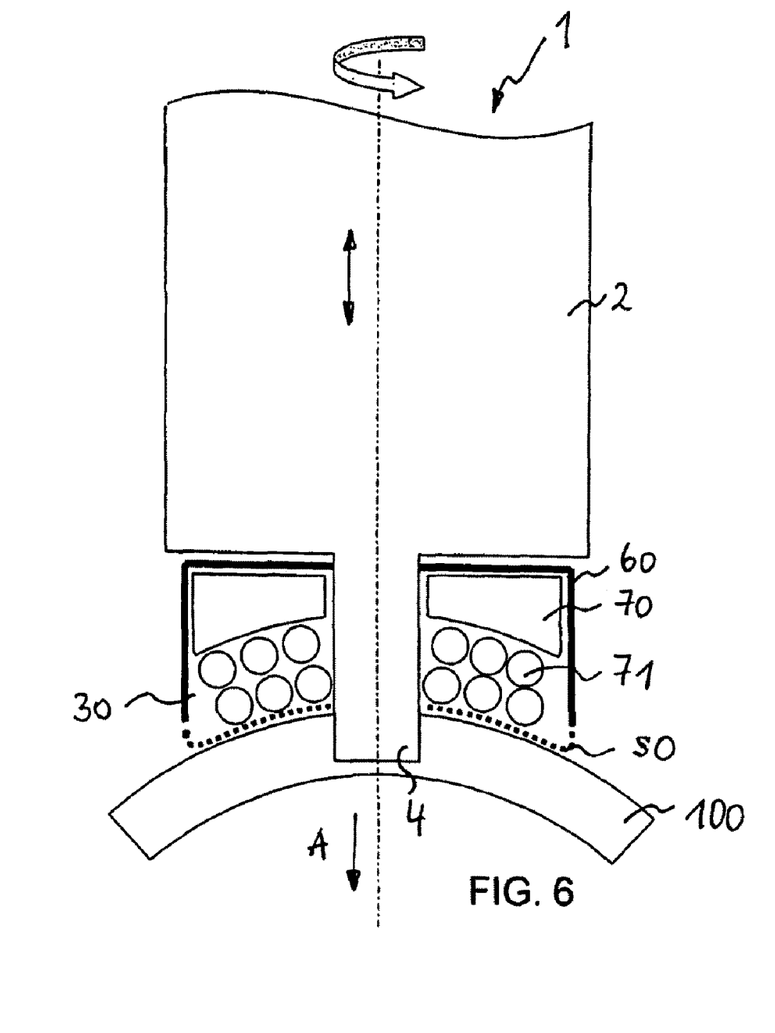
FIG. 6 shows a further modification of the friction-stir tool illustrated in FIG. 3-5.

A modification of the second embodiment is illustrated in FIG. 6. In the carrier body 60, in addition, loose filling bodies 71 are arranged, which are arranged between the freely formable body 70 and the open end of the carrier body 60. Loose filling bodies of this type are, for example, spheres of hard metal, ceramic or plastic which are displaceable at least in the axial direction. In this case, the shoulder surface 50 is formed by the loose filling bodies 71. The arrangement according to FIG. 6 likewise ensures that, when the rotating projection 4 is introduced, the surface 50 of the shoulder 60 adapts automatically to the form of the workpiece 100 and bears continuously against the surface of the workpiece 100. In addition, as already described in connection with FIG. 5, the open end of the carrier body 60 may be closed off by means of a flexible material which, however, is not illustrated in FIG. 6.

Figure 7:
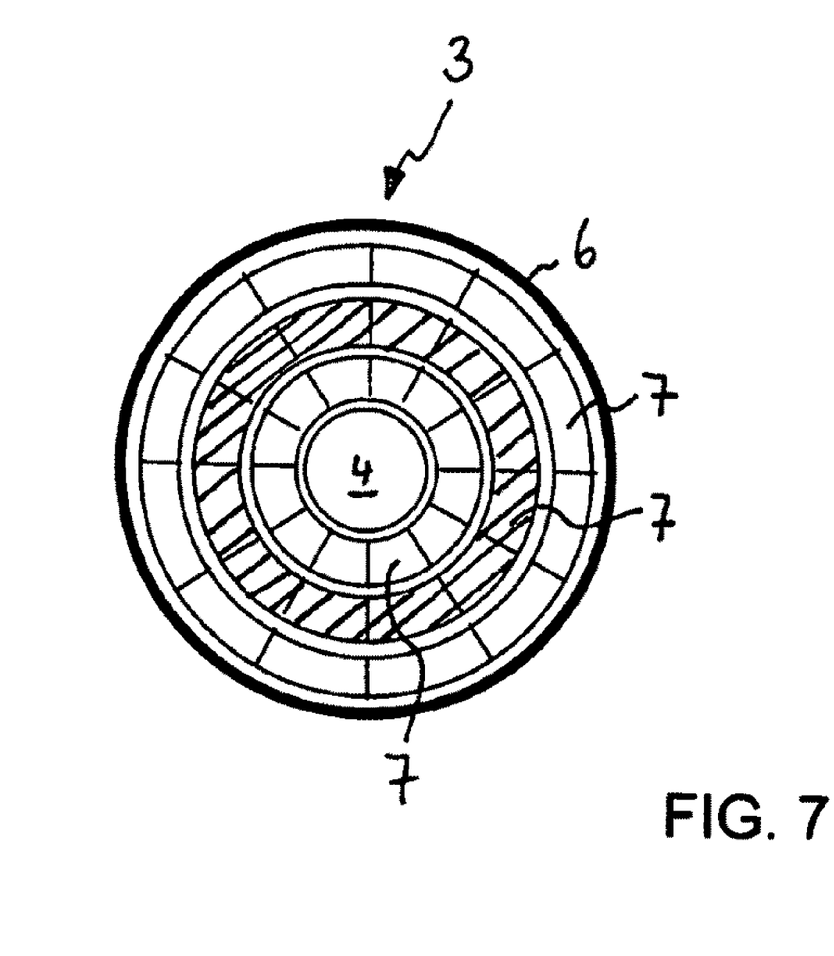
FIG. 7 shows cross-sectional views of the tool shoulder described in conjunction with FIGS. 1 and 2 or FIG. 6.

FIG. 7 shows, depicted on the right, a cross-sectional view of a shoulder 30 filled with loose filling bodies 71. Preferably, loose spheres are arranged so as to surround the rod-shaped projection 4 concentrically, in order thereby to ensure optimal adaptation to curved components. The loose filling bodies 71 may in this case, depending on position, have different strengths and/or be acted upon by different pressures.

LIST OF REFERENCE SYMBOLS

1 Friction-stir tool
2 Tool body
3 Shoulder
4 Rod-shaped projection
5 Shoulder surface
6 Carrier body
7 Individual element
8 Individual-element surface
9 Spring elements
30 Shoulder
50 Shoulder surface
60 Carrier body
61 Flexible material
70 Fluid cushion
71 Filling body
80 Fluid-cushion surface
100 Workpiece

The invention claimed is:

1. A friction-stir tool, comprising:
a rotary-drivable tool body;
a shoulder disposed at an end of the tool body facing away from a rotary drive, the shoulder being pushed onto a rotatable rod-shaped projection but not directly contacting the tool body; and
the rotatable rod-shaped projection extending from the tool body in a direction of the tool body facing away from the rotary drive and having a smaller diameter than the shoulder, wherein
the shoulder includes a carrier body at least partially open in a direction of the projection and at least one element disposed in the carrier body, the at least one element including an end pointing in the direction of the projection, a deformable surface of the shoulder pointing in the direction of the projection being formed by said end of each of the at least one element to match a contour of a workpiece.

2. A friction-stir tool according to claim 1, wherein the shoulder surface pointing in the direction of the projection is deformable reversibly.

3. A friction-stir tool according to claim 1, wherein the at least one element surrounds the projection concentrically.

4. A friction-stir tool according to claim 2, wherein the at least one element surrounds the projection concentrically.

5. A friction-stir tool according to claim 1, wherein the carrier body includes a plurality of axially displaceable elements, ends of the elements pointing in the direction of the projection forming the surface of the shoulder pointing in the direction of the projection.

6. A friction-stir tool according to claim 5, wherein the surface of the shoulder pointing in the direction of the projection is deformable reversibly.

7. A friction-stir tool according to claim 5, wherein the elements surround the projection concentrically.

8. A friction-stir tool according to claim 5, wherein each of the elements are connected to the carrier body via a spring element resilient in the axial direction.

9. A friction-stir tool according to claim 1, wherein the at least one element is a freely formable body, or a fluid cushion.

10. A friction-stir tool according to claim 9, wherein the shoulder surface pointing in the direction of the projection is deformable reversibly.

11. A friction-stir tool according to claim 9, wherein the at least one element is arranged so as to surround the projection concentrically.

12. A friction-stir tool according to claim 9, wherein that side of the at least one freely formable body that points in the direction of the projection is resilient and forms the shoulder surface pointing in the direction of the projection.

13. A friction-stir tool according to claim 9, wherein the carrier body has arranged in it, between the at least one freely formable body and the open end of the carrier body, loose filling bodies that are displaceable at least in the axial direction and that form the shoulder surface pointing in the direction of the projection.

14. A friction-stir tool according to claim 1, wherein the at least partially open end of the carrier body can be closed off by a flexible material.

15. A friction-stir tool according to claim 1, wherein the surface of the shoulder is contoured variably.

16. A friction-stir tool according to claim 1, wherein the surface of the shoulder is flexible such that the surface deforms to fit snugly with the contour of the workpiece.

17. A friction-stir tool according to claim 1, wherein the shoulder is activated independently of the projection.

18. A friction-stir tool according to claim 1, wherein the carrier body includes at least two elements that are axially movable with respect to each other such that the surface of the shoulder deforms as the end of said at least two elements move with respect to each other.

19. A friction-stir tool according to claim 1, wherein shoulder fits snugly against a surface of the workpiece.

20. A friction-stir tool, comprising:
a rotary-drivable tool body;

a shoulder disposed at an end of the tool body facing away from a rotary drive the shoulder being pushed onto a rotatable rod-shaped projection but not directly contacting the tool body;

the rotatable rod-shaped projection extending from the tool body in a direction of the tool body facing away from the rotary drive and having a smaller diameter than the shoulder, wherein the shoulder includes a carrier body at least partially open in a direction of the projection and a plurality of elements disposed in the carrier body, each element of the plurality of elements including an end pointing in the direction of the projection, a deformable surface of the shoulder pointing in the direction of the projection being formed by said end of each element of the plurality of elements to match a contour of a workpiece, wherein the carrier body includes a plurality of axially displaceable elements, ends of the elements pointing in the direction of the projection forming the surface of the shoulder pointing in the direction of the projection, the elements are rod-shaped segments, longitudinal axes of the segments being oriented in the axial direction, and cross sections of the rod-shaped segments surrounding the projection form concentric circular rings.

21. A friction-stir tool according to claim 20, wherein each of the elements are connected to the carrier body via a spring element resilient in the axial direction.

22. A friction-stir tool according to claim 20, wherein the shoulder has a form of a circular tubular cylinder.

* * * * *